United States Patent [19]
Yuki et al.

[11] Patent Number: 5,542,243
[45] Date of Patent: Aug. 6, 1996

[54] LAWN TRACTOR HAVING A BLOWER UNIT AND A GRASS CLIPPINGS TRANSPORT DUCT

[75] Inventors: Mikio Yuki; Kazuaki Kurohara; Akio Matsui; Katsuhiko Uemura, all of Sakai, Japan

[73] Assignee: Kubota Corporation, Osaka, Japan

[21] Appl. No.: 305,951

[22] Filed: Sep. 29, 1994

[30] Foreign Application Priority Data

Dec. 9, 1993 [JP] Japan .................. 5-308796

[51] Int. Cl.$^6$ .................................. A01D 34/70
[52] U.S. Cl. .................. 56/13.3; 56/16.6; 56/320.1; 56/DIG. 8
[58] Field of Search .................... 56/13.3, 13.4, 56/16.6, 202, 320.1, 320.2, DIG. 8, DIG. 9

[56] References Cited

U.S. PATENT DOCUMENTS

| | | |
|---|---|---|
| 3,065,588 | 11/1962 | Shaw . |
| 3,969,876 | 7/1976 | Turos ........................... 56/202 |
| 4,345,416 | 8/1982 | Cameron ........................ 56/16.6 X |
| 4,411,125 | 10/1983 | Strickland ..................... 56/13.4 X |
| 4,523,788 | 6/1985 | Prasad .......................... 298/11 |
| 4,558,559 | 12/1985 | Klever et al. ................. 56/16.6 X |
| 4,579,363 | 4/1986 | Allen et al. .................. 280/474 |
| 4,711,073 | 12/1987 | Freier, Jr. et al. ........... 56/13.3 |
| 4,945,716 | 8/1990 | Murakawa et al. .............. 56/13.3 |
| 4,996,829 | 3/1991 | Saitoh et al. ................. 56/13.3 |
| 5,064,315 | 11/1991 | Samejima et al. .............. 406/100 |
| 5,070,683 | 12/1991 | Eggenmueller ................. 56/202 X |
| 5,107,661 | 4/1992 | Shimamura .................... 56/12.8 |
| 5,224,327 | 7/1993 | Minoura et al. ............... 56/13.3 |

Primary Examiner—Terry Lee Melius
Attorney, Agent, or Firm—Fisher & Associates

[57] ABSTRACT

A lawn tractor has an engine, front wheels and rear wheels, a body frame extending longitudinally of the tractor, a mower unit supported by the body frame, a grass catcher supported by the body frame, a blower unit supported by the body frame, and a duct for transporting grass clippings cut by the mower unit into the grass catcher. The duct includes a first duct portion extending between the mower unit and the blower unit, and a second duct portion extending between the blower unit and the grass catcher. An output shaft of the engine, an input shaft of the mower unit and an input shaft of the blower unit all extend vertically. The engine output shaft, mower input shaft and blower input shaft are arranged inwardly of the rear wheels in the transverse direction of the body frame and substantially linearly in the longitudinal direction thereof. The engine output shaft and mower input shaft are interconnected through a first belt transmission mechanism, and the mower input shaft and blower input shaft are interconnected through a second belt transmission mechanism.

12 Claims, 7 Drawing Sheets

LAWN TRACTOR HAVING A BLOWER UNIT AND A GRASS CLIPPINGS TRANSPORT DUCT

BACKGROUND OF THE INVENTION

1. Field of the Invention

The present invention relates to a lawn and garden tractor having a mower unit vertically movably attached to a tractor body, a grass catcher attached to the tractor body, a duct for transporting grass clippings cut by the mower unit to the grass catcher, and a blower unit for aiding the transport of grass clippings.

2. Description of the Related Art

A conventional lawn tractor of this type is exemplified by the mid-mount type lawn tractor disclosed in U.S. Pat. No. 5,064,315. This tractor includes a mower unit suspended from a tractor body through a link mechanism or the like. The mower unit has a housing extending transversely of the tractor body, with one end thereof projecting from a right side of the tractor body. A blower unit is fixed to a grass outlet formed in the projecting end of the housing.

In the above conventional construction, however, the center of gravity of the entire mower unit is offset transversely of the tractor body toward the projecting end because of the weight of the blower unit. Thus, the mower unit has an imbalance of weight transversely of the tractor body. During a grass cutting operation, the mower unit tends to dip at one side thereof, resulting in a grass cutting height varying transversely of the tractor body, and in unsteady vertical movement of the mower unit.

These inconveniences may be overcome by employing a construction in which the blower unit is supported by the tractor body instead of the mower unit, thereby to eliminate the imbalance of the mower unit due to the weight of the blower unit. Such a construction requires modifications in a positional relationship of the grass transporting duct to the grass outlet of the mower unit and the blower unit, and in a power transmitting structure from the engine to the mower unit and blower unit. These modifications must be effected without impairing performance or raising cost. For this purpose, it is necessary to seek a new lawn tractor construction, taking into account an arrangement and construction of the duct and blower unit collectively. Further, an efficient and simplified transmission mechanism is required for transmitting engine power to the mower unit and blower unit.

SUMMARY OF THE INVENTION

An object of the present invention is to provide an arrangement and construction of a blower unit in a lawn tractor, which allow the blower unit to be supported independently of a mower unit, and an arrangement and construction of a grass transporting duct suited to the blower unit.

Another object of the invention is to provide a suitable structure for transmitting engine power to a mower unit and a blower unit.

By fulfilling these objects, the posture and vertical movement of the mower unit may be stabilized and the power transmission from the engine to the mower unit simplified in a lawn and garden tractor having a duct for transporting grass clippings cut by the mower unit to the grass catcher, and a blower for aiding the transport of grass clippings.

The above objects are fulfilled, according to the present invention, by a lawn tractor having an engine, comprising:
front wheels and rear wheels;
a body frame extending longitudinally of the tractor and including a rear extension reaching a rear wheel region;
a mower unit supported by the body frame;
a grass catcher supported by the body frame;
a duct for transporting grass clippings cut by the mower unit into the grass catcher; and
a blower unit for aiding transport of the grass clippings;
wherein the blower unit is supported by the body frame and having a vertical blower input shaft for receiving power.

According to the present invention, the blower unit is supported by the body frame instead of the mower unit, to avoid an imbalance of the mower unit due to the weight of the blower unit. Further, the vertical blower input shaft has the advantage of limiting a horizontal protrusion of a power transmission mechanism. Particularly where the blower input shaft is disposed inwardly of the rear wheels in the transverse direction of the body frame, the blower unit is substantially contained within lateral bounds of the body frame. Thus, the entire lawn tractor has a neat appearance. The tractor's appearance may be further improved where at least part of the duct is disposed inwardly of the rear wheels in the transverse direction of the body frame.

Power of the engine may be transmitted to one of the mower unit and blower unit through a first transmission mechanism, and to the other through a second transmission mechanism which takes power from the first transmission mechanism. Then, it is unnecessary to transmit the engine power separately to the mower unit and blower unit, and the mower unit connected to an output of the engine may have only a component of the second transmission mechanism for transmitting power to the blower unit. The second transmission mechanism may be in form of a belt transmission mechanism. Then, a belt deformation can accommodate a relative movement between the mower unit and blower unit. This construction has an advantage of simplicity over a shaft transmission mechanism which transmits power through a universal joint or the like to allow a relative movement between the mower unit and blower unit.

Other features and advantages of the present invention will be apparent from the following description of embodiments taken in conjunction with the drawings.

DESCRIPTION OF THE PREFERRED EMBODIMENTS

Figure 1:
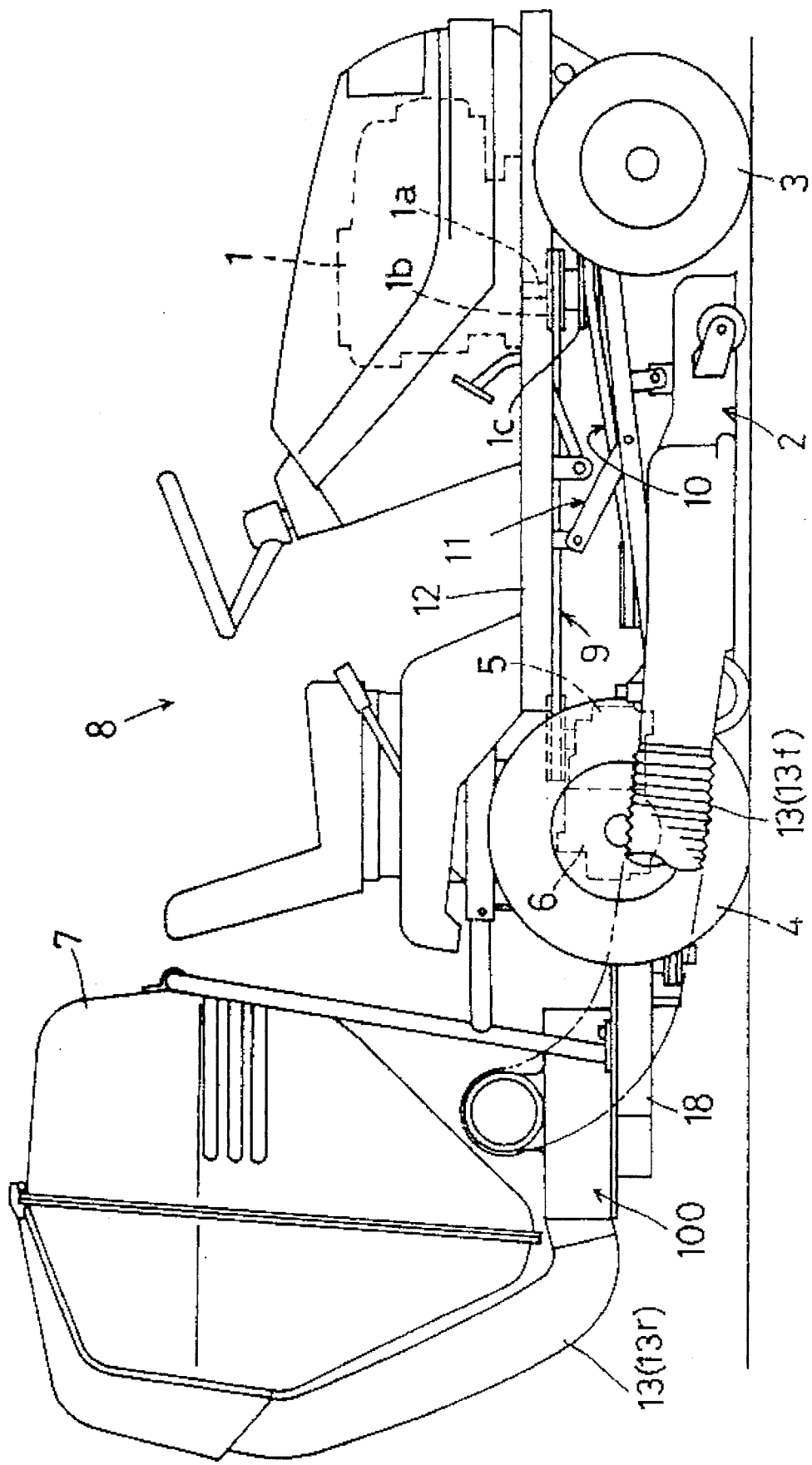
FIG. 1 is a side elevation of a mid-mount type lawn tractor.

FIG. 1 shows a mid-mount type lawn tractor. This lawn tractor has an engine 1 mounted on a front portion of a body frame 12 supported by front wheels 3 and rear wheels 4. The body frame 12 supports a two-blade type mower unit 2 suspended from a middle portion thereof through a link mechanism 11. The rear wheels 4 are driven by power transmitted from the engine 1 through a propelling belt transmission mechanism 9, a hydrostatic stepless transmission (hereinafter called HST) 5 and a transmission 6. As described in detail later, the mower unit 2 receives power from the engine 1 through a vertical output shaft 1a of the engine 1 and a first belt transmission mechanism 10. A grass catcher 7 is supported on a rear portion of the body frame 12. A driver's section 8 is formed on an intermediate portion of the body frame 12.

Figure 2:
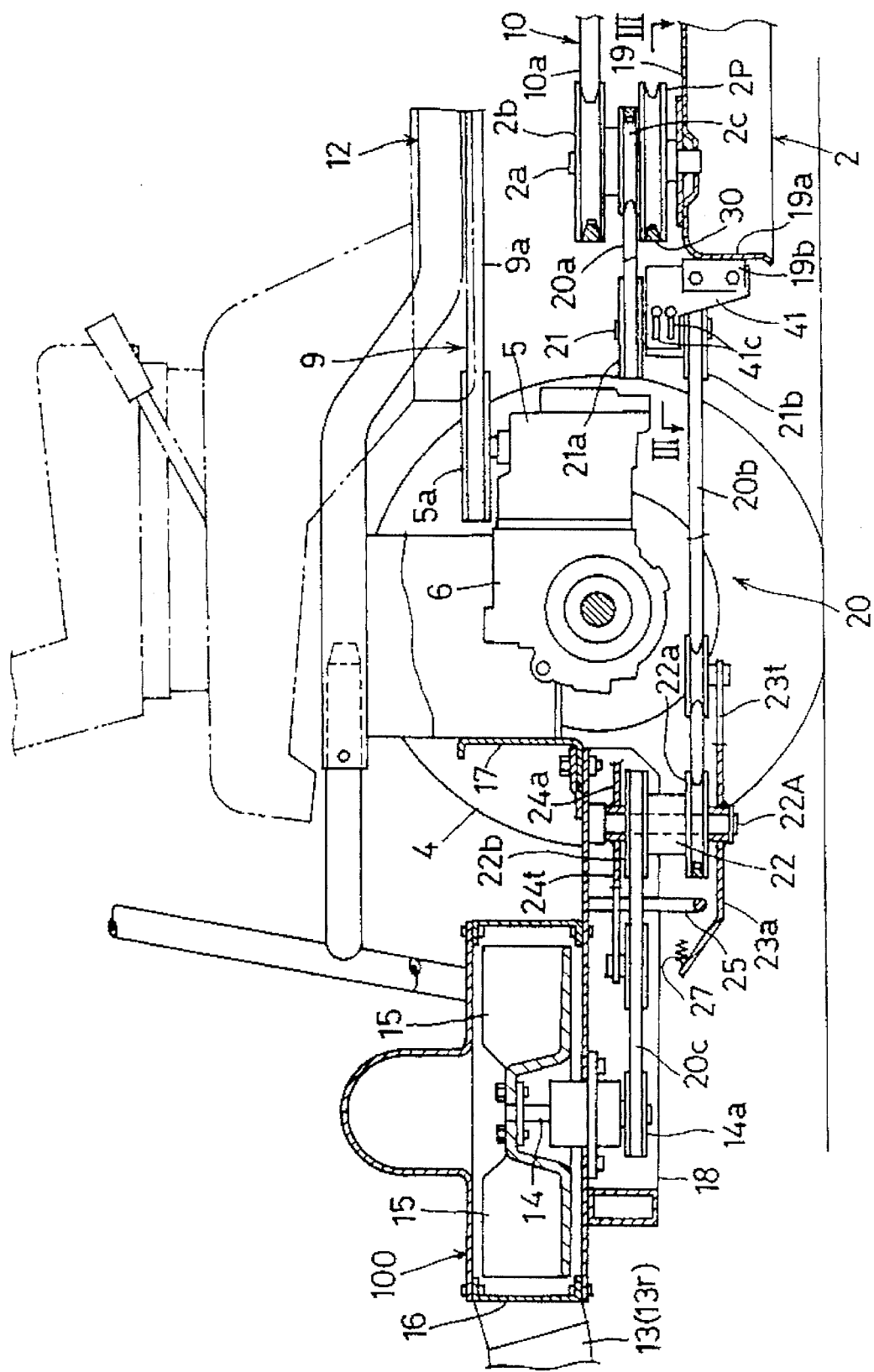
FIG. 2 is a side view showing a transmission system for a mower unit and a blower unit.

As seen from FIG. 2, the propelling belt transmission mechanism 9 for transmitting power from the output shaft 1a of the engine 1 to the HST 5 includes a first output pulley 1b mounted on an upper shank portion of the output shaft 1a, an input pulley 5a of HST 5, and a belt 9a wound around the output pulley 1b and input pulley 5a. The first belt transmission mechanism 10 for transmitting power from the engine 1 to the mower unit 2 includes a second output pulley 1c mounted on a lower shank portion of the output shaft 1a, an input pulley 2b rotatably mounted on a fixed shaft 2a acting as a vertical input shaft of the mower unit 2, and a belt 10a wound around the output pulley 1c and input pulley 2b.

A first output pulley 2c and a blade drive pulley 2p are formed integral with a lower surface of the input pulley 2b to be rotatable together.

The mower unit 2 is vertically adjustably suspended from the body frame 12 through the link mechanism 11. The mower unit 2 has a blade housing 19 extending transversely of the body frame 12. The housing includes a grass outlet located at a right side of the body frame 12. This grass outlet communicates through a grass transporting duct 13 with a grass inlet of the grass catcher 7 supported on the rear portion of the body frame 12. The duct 13 has a blower 100 mounted in an intermediate position thereof for forcibly transporting grass clippings from the mower unit 2 toward the grass catcher 7. The blower 100 is supported on an extension frame 18 forming part of the body frame 12.

Figure 3:
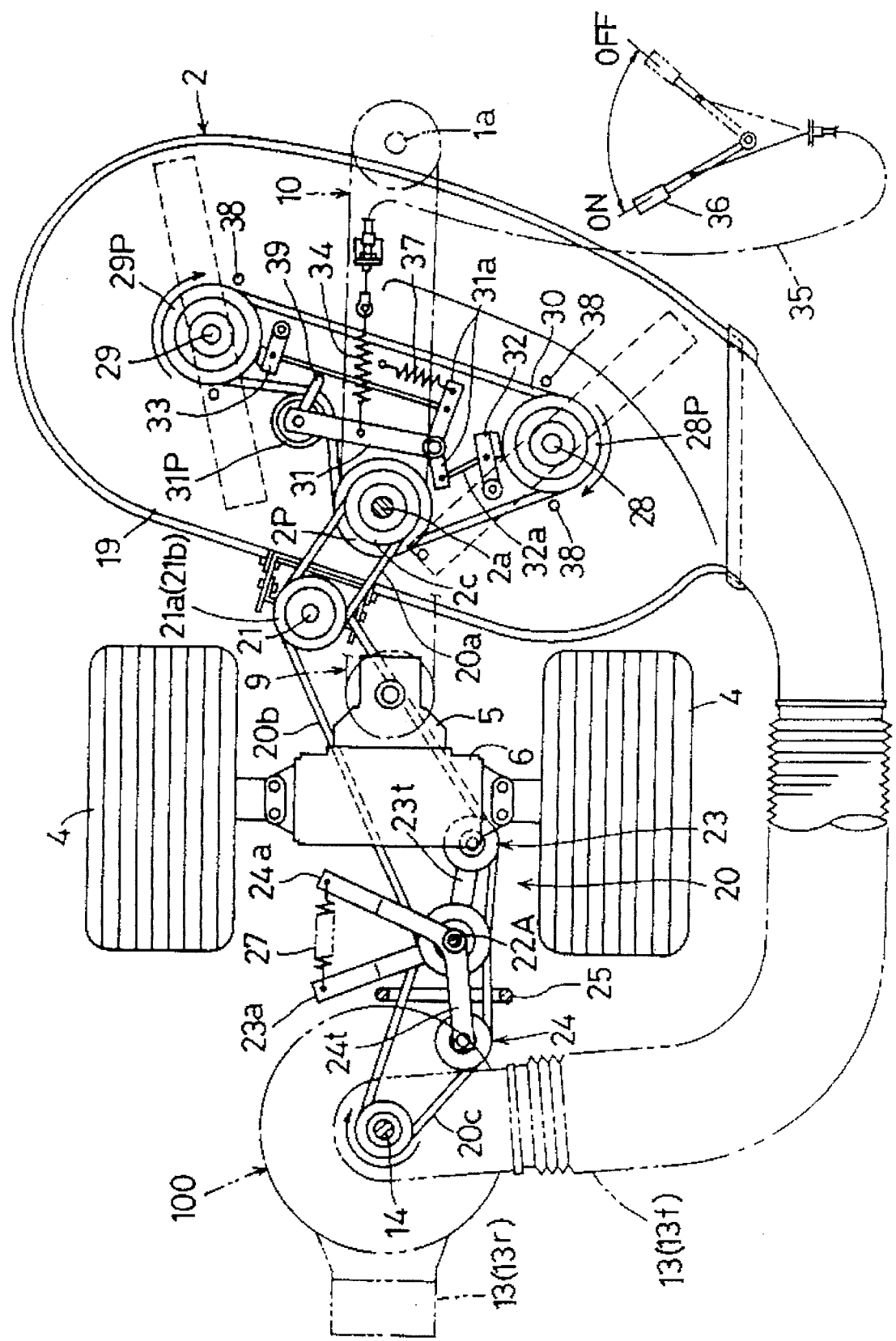
FIG. 3 is a plan view showing the transmission system for the mower unit and blower unit.

As shown in FIGS. 1 through 3, the blower 100 has a vertical rotary shaft 14 with rotary vanes 15 arranged horizontally. The duct 13 includes a first, front duct portion 13f and a second, rear duct portion 13r. The front duct portion 13f extends from the grass output of the mower unit 2 outwardly around the right rear wheel 4 to an intake opening formed in an upper central position of the blower 100. The rear duct portion 13r extends from an outlet opening of a blower case 16 along a rear surface of the grass catcher 7 to the grass inlet thereof.

The blower 100 is supported by the body frame 12, with the blower case 16 bolted to the extension frame 18 extending rearwardly from a cross frame 17 disposed in a rear position of the body frame 12.

Power is transmitted from the first belt transmission mechanism 10 to the blower 100 through a second belt transmission mechanism 20. This transmission mechanism 20 includes a first endless belt 20a, a second endless belt 20b and a third endless belt 20c arranged from the first output pulley 2c rotatable with the input pulley 2b of the first belt transmission mechanism 10 to the rotary vanes 15 of the blower 100.

That is, power is transmitted from the first belt transmission mechanism 10 to the first endless belt 20a, and then to the second endless belt 20b through a first relay shaft 21 supported by a rear wall 19a of the blade housing 19 and having a first relay pulley 21a and a second relay pulley 21b. Power is transmitted from the second endless belt 20b to the third endless belt 20c through a second relay sleeve shaft 22 fitted on a support axis 22A supported by the extension frame 18 on which the blower 100 is mounted, the second relay sleeve shaft 22 having a third relay pulley 22a and a fourth relay pulley 22b. Then, power is transmitted from the third endless belt 20c to a drive pulley 14a mounted on the rotary shaft 14 of the rotary vanes 15. Thus, the rotary shaft 14 acts as a vertical input shaft of the blower 100.

The second belt transmission mechanism 20 extends around and below the HST 5 and transmission 6, with the second endless belt 20b disposed directly under the HST 5 and transmission 6. Numeral 25 denotes a guard cover for protecting the third relay pulley 22a on the second relay shaft 22 when the tractor moves backward.

As seen from FIG. 3, the engine output shaft 1a, the input shaft 2a of the mower unit 2 and the input shaft 14 of the blower 100 are arranged substantially linearly in the longitudinal direction of the tractor and inwardly of the rear wheels 4 in the transverse direction of the tractor. This arrangement provides a balanced arrangement of the engine 1, mower unit 2 and blower 100. This shaft arrangement also allows the first belt transmission mechanism 10 and second belt transmission mechanism 20 to be disposed inwardly of the rear wheels 4 in the transverse direction of the tractor.

As shown in FIG. 3, the second belt transmission mechanism 20 has belt tension mechanisms 23 and 24. The belt tension mechanism 23 includes a tension arm 23t for applying a tension to the second endless belt 20b. The belt tension mechanism 24 includes a tension arm 24t for applying a tension to the third endless belt 20c. The two tension arms 23t and 24t are pivotable on the support axis 22A fitted in the second relay sleeve shaft 22. The tension arms 23t and 24t have proximal arm portions 23a and 24a bent upward and downward, respectively, to attain the same height, with a single tension coil spring 27 extending therebetween. Thus, the two belt tension mechanisms 23 and 24 share the single tension coil spring 27 for economy.

A drive structure of the mower unit 2 includes a right pulley 28P mounted on a right blade shaft 28, a left pulley 29P mounted on a left blade shaft 29, a tension pulley 31P, and a transmission belt 30 wound around these pulleys. The blade housing 19 pivotably supports brake shoes 32 and 33 for acting on the right and left pulleys 28P and 29P, respectively. Each of the brake shoes 32 and 33 is connected to one part of a bifurcate end 31a of a tension arm 31 through a rod 32a.

The tension arm 31 is connected to a blade clutch lever 36 through a wire 35 having a tension coil spring 34. A brake spring 37 extends between one part of the bifurcate end 31a of the tension arm 31 and the blade housing 19.

When the blade clutch lever 36 is moved to ON position, the tension coil spring 34 pulls the tension arm 31, which in turn tightens the transmission belt 30 to establish a clutching state. When the blade clutch lever 36 is moved to OFF position, the wire 35 is relaxed. Then, the brake spring 37 presses the two brake shoes 32 and 33 against the right and left pulleys 28P and 29P, respectively, to brake and stop rotation of blades quickly. A plurality of belt pressers 38 are provided to operate in time of declutching. The tension arm 31 includes a belt presser 39 for forcibly returning the transmission belt 30 in time of declutching.

Figure 4:
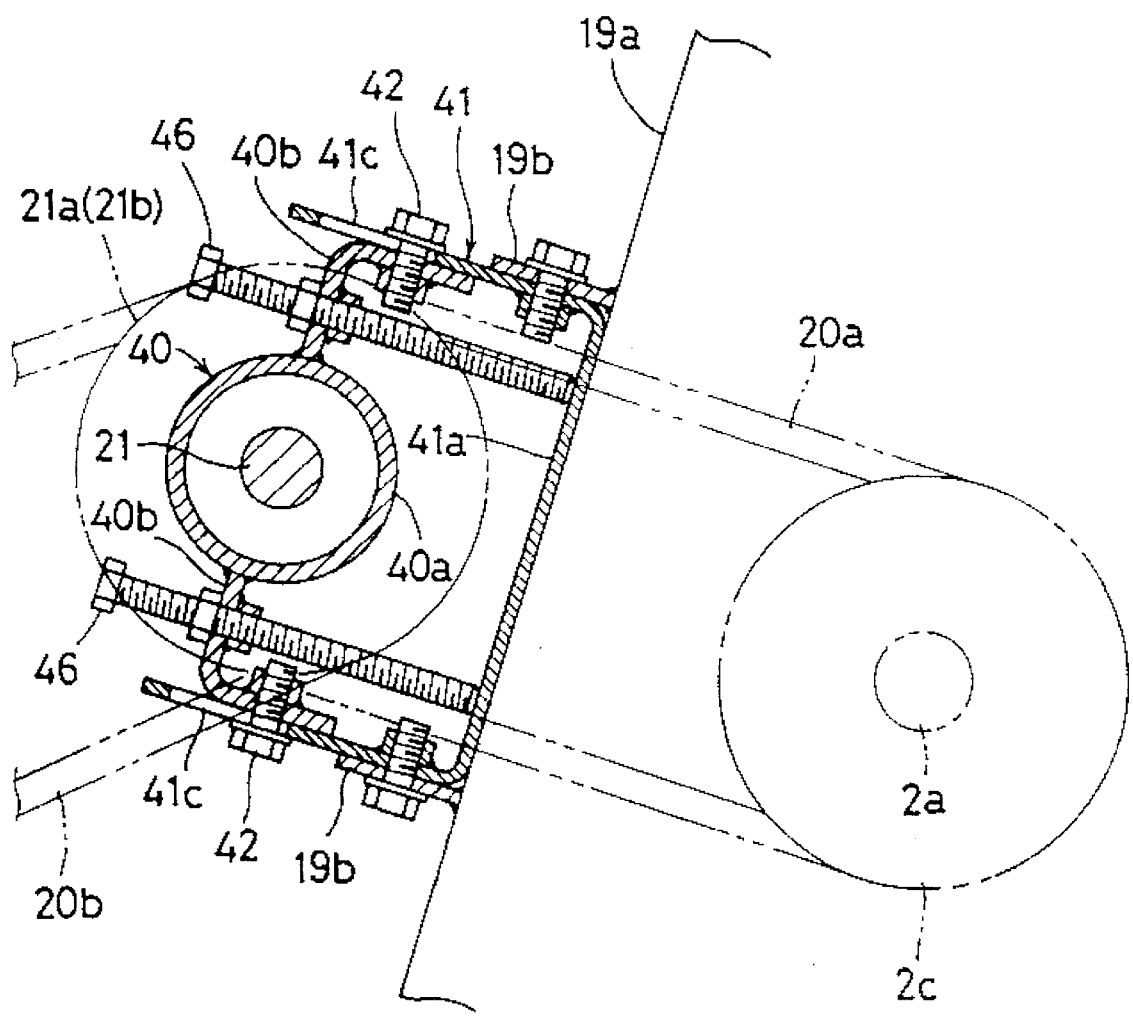
FIG. 4 is a section taken on line III—III of FIG. 2.

As shown in FIG. 4, the first relay shaft 21 is supported by a support structure including a movable portion 40 and a stationary portion 41. The movable portion 40 includes a cylindrical bearing 40*a* for supporting the first relay shaft 21, and a pair of L-shaped brackets 40*b* connected to opposite sides of the bearing 40*a*. The stationary portion 41 includes a pair of brackets 19*b* fixed to the rear wall 19*a* of the blade housing 19, and a channel-shaped bracket 41*a* bolted to the brackets 19*b*. The stationary portion 40 is fixable relative to the blade housing 19, with the L-shaped brackets 40*b* and channel-shaped bracket 41*a* fixed to each other by bolts 42 extending through two, upper and lower, slots 41*c* formed in the channel-shaped bracket 41*a*.

When the bolts 42 are loosened, the stationary portion 40 is movable relative to the blade housing 19 in directions extending between the input shaft 2*a* of the mower unit 2 and the first relay shaft 21 and within a longitudinal range of the slots 41*c*. By varying positions of the first relay shaft 21, the tension of the first belt 20*a* may be adjusted.

Jack bolts 46 are screwed through the L-shaped brackets 40*b* of the movable portion 40 to have forward ends thereof contacting an inner surface of the channel-shaped bracket 41*a* of the stationary portion 41, respectively. By turning the jack bolts 46, the position of the movable portion 40 relative to the stationary portion 41 may be varied with ease regardless of the tension of the first belt 20*a*. Even when the bolts 42 become loose inadvertently, the jack bolts 46 limit movement of the movable portion 40 toward the mower unit 2.

In the foregoing embodiment, the front duct portion 13*f* extends outwardly around the right side of the body frame 12, and the second belt transmission mechanism 20 extends around and below the HST 5 and transmission 6. The invention is not limited to such construction.

Figure 5:
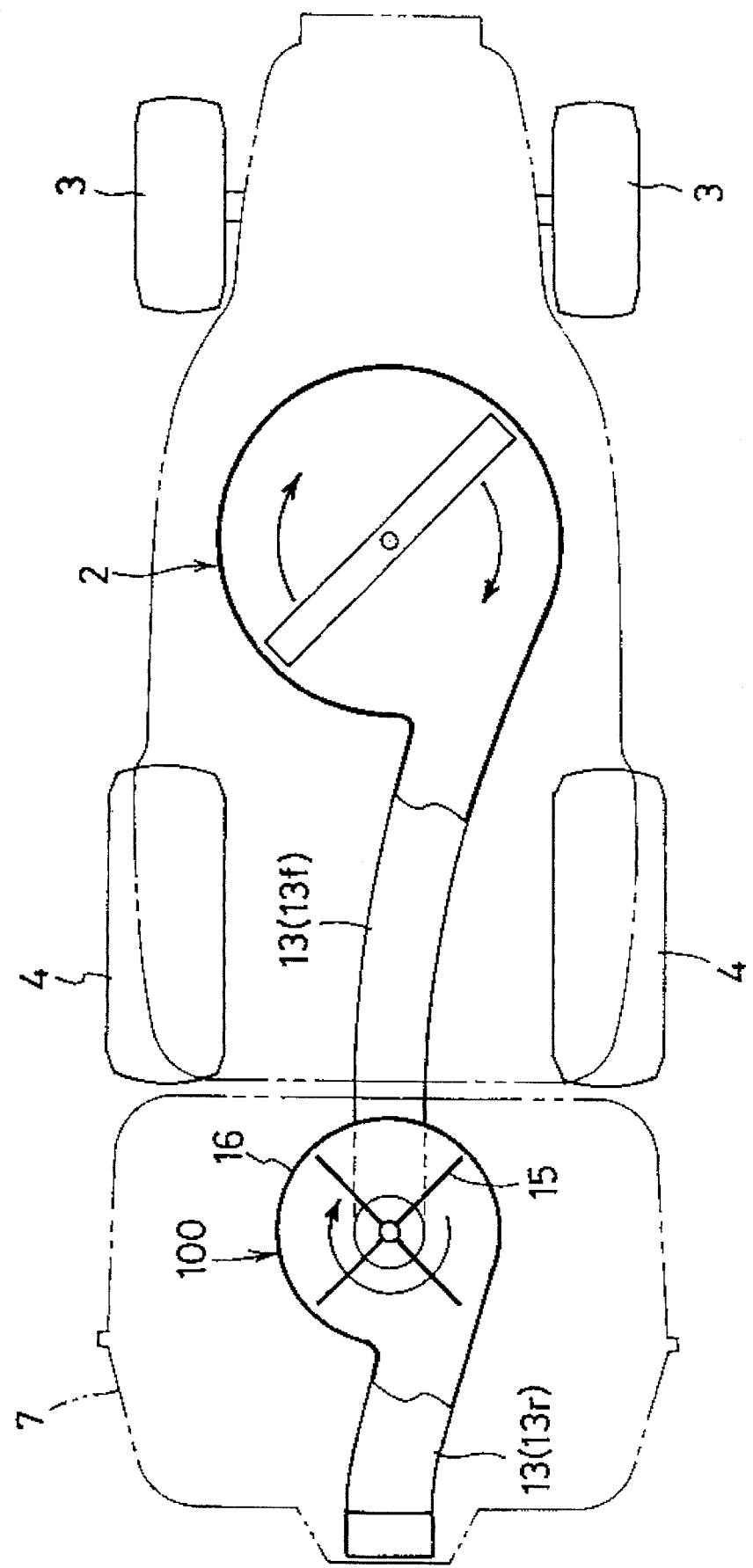
FIG. 5 is a schematic plan view showing a second embodiment of the invention.
Figure 6:
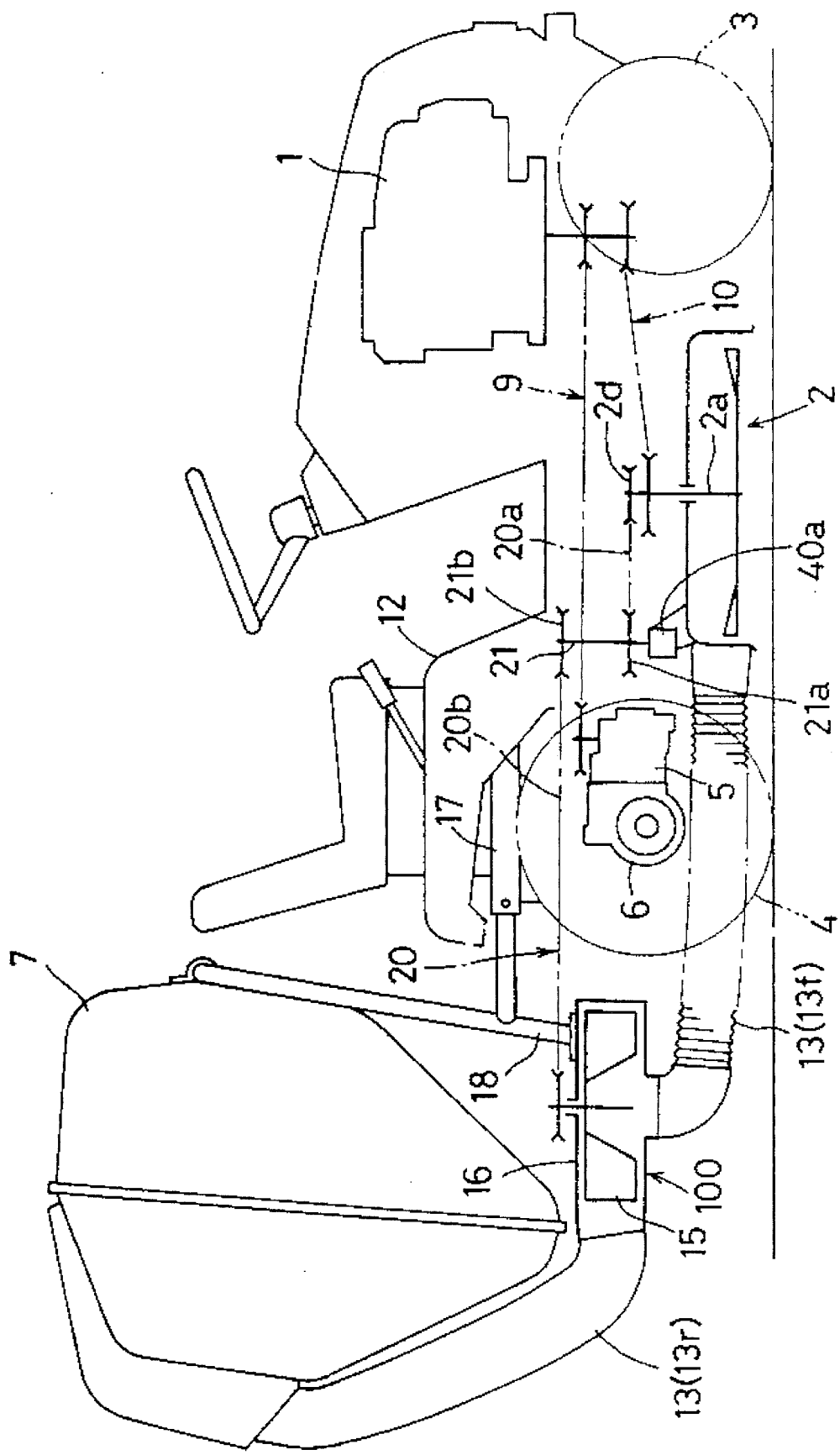
FIG. 6 is a schematic side view showing the second embodiment.

As shown in FIGS. 5 and 6, for example, the mower unit 2 may be the single blade type having a grass outlet formed in the rear wall of the blade housing 19. In this case, the blower 100 supported on the rear portion of the body frame 12 through the extension frame 18 defines a grass inlet centrally of a lower surface of the blower case 16. The front duct portion 13*f* extends from the grass outlet of the mower unit 2 below the HST 5 and transmission 6 to the grass inlet of the blower case 16.

In this construction, the front duct portion 13*f* provides substantially the shortest distance of grass transport. Further, substantially the entire duct 13 is contained inwardly of the wheels, which gives the lawn tractor a neat appearance and which is particularly advantageous for turning the tractor round.

As seen from FIG. 6, part of the second transmission mechanism 20 for transmitting power to the blower 100 from the first output pulley 2*c* mounted on the input shaft 2*d* of the first transmission mechanism 10 extends through a space above the HST 5 and transmission 6 without interfering with the propelling transmission mechanism 9.

With this transmission mechanism 20, power transmitted from the first output pulley 2*c* to a first endless belt 20*a* is transmitted to a second endless belt 20*b* through a first relay shaft 21 supported by the rear wall 19*a* of the blade housing 19 and having a first relay pulley 21*a* and a second relay pulley 21*b*. Power is then transmitted from the second endless belt 20*b* to the drive pulley 14*a* mounted on the rotary shaft 14 of the rotary vanes 15 of the blower 100.

Figure 7:
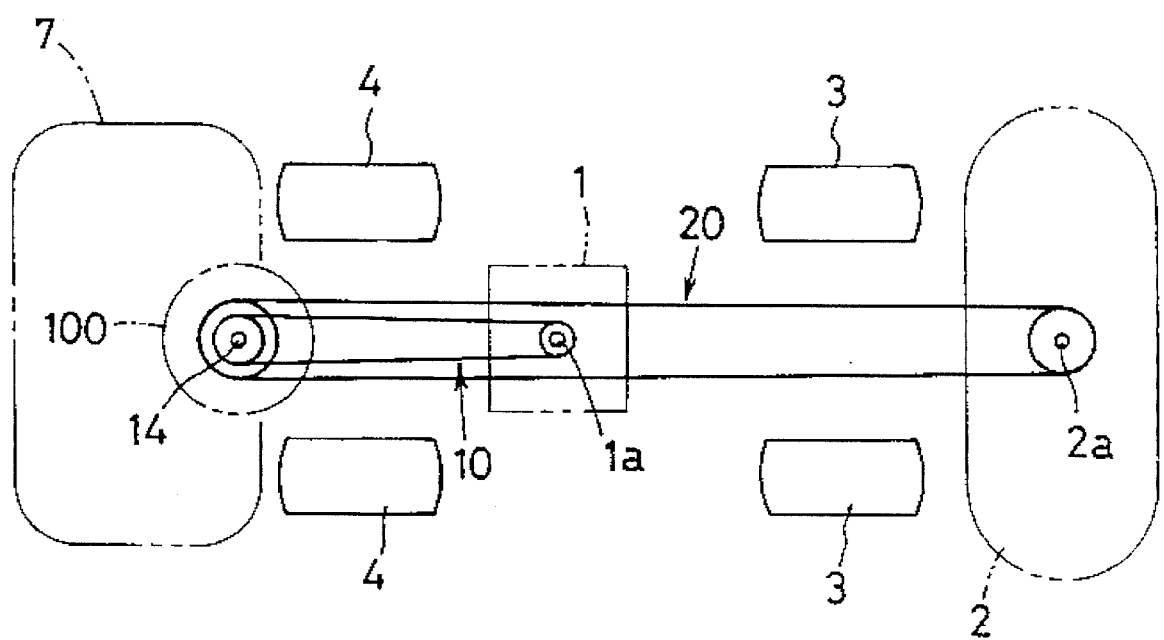
FIG. 7 is a schematic plan view of a third embodiment of the invention.

The other aspects of this embodiment are the same as in the first embodiment. As shown in FIG. 7, power may be transmitted from the output shaft 1*a* of the engine 1 to the rotary shaft 14 of the blower 100 through a first transmission mechanism 10, and from the first transmission mechanism 10 to the mower unit 2 through a second belt transmission mechanism 20.

In all of the embodiments described, it is possible within the scope of the present invention to replace the belt transmission mechanisms 10 and 20 with chain transmission mechanisms or other types of transmission mechanisms.

What is claimed is:

1. A lawn tractor having an engine, comprising: front wheels and rear wheels;

a frame extending longitudinally and including a rear extension reaching a rear wheel region;

a mower unit supported by said frame and having a vertical mower input shaft for receiving power from an output shaft of said engine;

a grass catcher supported by said rear extension;

a blower unit disposed between said rear wheels in a transverse direction of said body frame, supported by said rear extension and having a vertical blower input shaft for receiving power from an output shaft of said engine, wherein said blower input shaft extends parallel to said mower input shaft; and duct means for transporting grass clippings cut by said mower unit into said grass catcher, said duct means including a first duct extending between said mower unit and said blower unit, and a second duct extending between said blower unit and said grass catcher;

wherein said mower input shaft extends parallel to said blower input shaft and;

said output shaft of said engine, said mower input shaft and said blower input shaft are arranged inwardly of said rear wheels in a transverse direction of the tractor and substantially linearly in a longitudinal direction of said tractor; and said output shaft of said engine, said mower input shaft and said blower input shaft are interconnected through a transmission means including a plurality of belts and pulleys.

2. A lawn tractor as defined in claim 1, wherein said transmission means comprises a first transmission means interconnecting said engine output shaft and said mower input shaft and a second transmission means interconnecting said mower input shaft and said blower input shaft.

3. A lawn tractor as defined in claim 1, wherein said transmission means comprises a first transmission means interconnecting said engine output shaft and said blower input shaft and a second transmission means interconnecting said blower input shaft and said mower input shaft.

4. A lawn tractor as defined in claim 1, wherein said transmission means comprises a first transmission means interconnecting said engine output shaft and said blower input shaft and a second transmission means interconnecting said engine output shaft and said mower input shaft.

5. A lawn tractor as defined in claim 2, wherein said first transmission means and said second transmission means include a first belt transmission means and a second transmission means, wherein said first rotation transmission means comprises:

an output rotating means mounted on said engine output shaft;

an input rotating means rotatably mounted on said mower input shaft;

a means for controlling motion of said output rotating means and said input rotating means; and wherein said second rotation transmission means further comprises:

a first means for rotating coupled with said input rotating means of said mower input shaft;

a first relay shaft having an input means for rotating and an output means for rotating;

a second relay shaft having an input means for rotating and an output means for rotating;

a first power transmission means coupled with said first means for rotating and said input means for rotating of said first relay shaft;

a second power transmission means coupled with said output means for rotating of said first relay shaft and said input means for rotating of said second relay shaft; and a third power transmission means coupled with said output means for rotating of said second relay shaft and said blower input shaft.

6. A lawn tractor as defined in claim 5, wherein said output rotating means and said input rotating means include a first pulley and a second pulley respectively, and wherein said means for controlling motion includes a belt.

7. A lawn tractor as defined in claim 5, wherein:

said first means for rotating comprises a pulley rigidly mounted on said mower input shaft;

said input means for rotating and said output means for rotating comprise an input pulley and an output pulley respectively, wherein said input and output pulleys are rigidly mounted on said first relay shaft;

said input means for rotating and said output means for rotating comprise a first and second pulley respectively, wherein said first and second pulleys are rigidly mounted on said relay shaft; and said first, second and third power transmission means comprise endless belts.

8. A lawn tractor as claimed in claim 1, wherein said duct means extends through a space substantially inwardly of said rear wheels in the transverse direction of said frame.

9. A lawn tractor as claimed in claim 1, wherein said blower unit is disposed below said grass catcher.

10. A lawn tractor as claimed in claim 9, wherein said second duct has one end thereof connected to said blower unit, an intermediate portion extending upward along a rear wall of said grass catcher, and the other end connected to a grass inlet formed in an upper position of said grass catcher.

11. A lawn tractor as claimed in claim 1, wherein said first duct has one end thereof connected to said mower unit, an intermediate portion extending outwardly around one of said rear wheels, and the other end connected to said blower unit.

12. A lawn tractor as claimed in claim 1, further comprising a clutch coupling with said first transmission means and said second transmission means.

* * * * *